J. J. LAHAYE.
Car-Couplings.
No. 158,948. Patented Jan. 19, 1875.
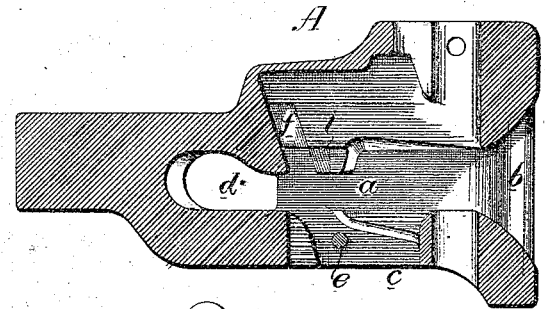
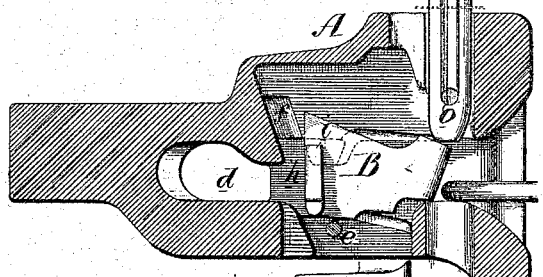
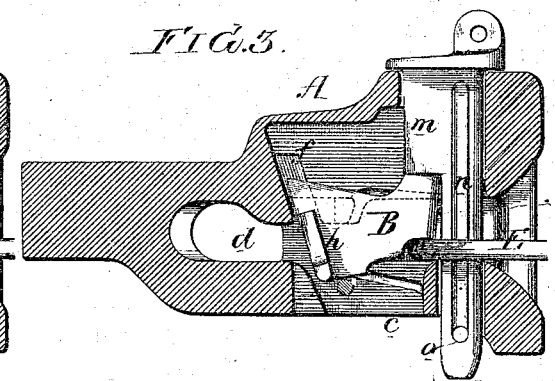
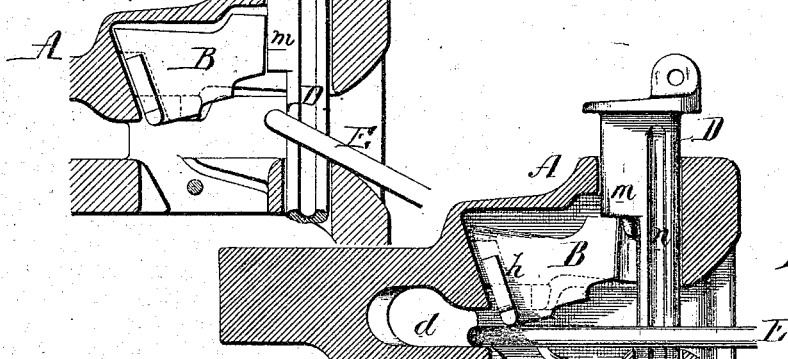
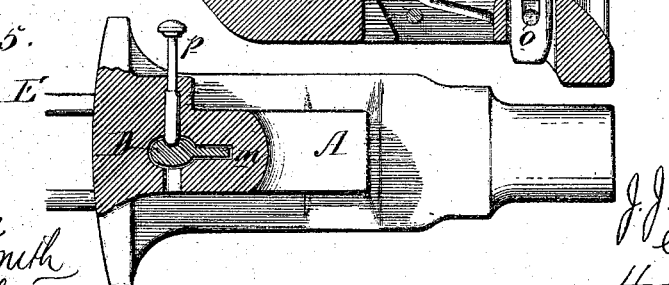
Witnesses
Harry Smith
Thomas McIlvain
J. J. Lahaye
by his attys.
Howson & Son

UNITED STATES PATENT OFFICE.

JOHN J. LAHAYE, OF READING, PENNSYLVANIA.

IMPROVEMENT IN CAR-COUPLINGS.

Specification forming part of Letters Patent No. 158,948, dated January 19, 1875; application filed November 3, 1874.

*To all whom it may concern:*

Be it known that I, JOHN J. LAHAYE, of Reading, Berks county, State of Pennsylvania, have invented an Improvement in Car-Couplings, of which the following is a specification:

My invention relates to certain improvements in the car-coupling for which Letters Patent were granted to me on the 14th day of May, 1874; and the main objects of my present improvements are to render the coupling more certain in its action, and to prevent the bending or breaking of the links, when subjected to undue pressure. These objects I attain by constructing the coupling in the manner which I will now proceed to describe, reference being had to the accompanying drawing, in which—

Figure 1 is a vertical section of the coupling-heads with the working parts removed; Figs. 2, 3, and 4, vertical sections of the coupling, showing the parts in different positions; and Fig. 5, a plan view, partly in section.

I may remark in the outset that automatic couplings require a firm backing for the end of the link, in order that the coupling with the adjoining car may be effected. This immovable backing prevents the yielding of the link when it meets with any obstacle, the result being the bending or breaking of the said link. The coupling described in my above-mentioned patent was objectionable in this respect, for although provision was made for the accommodation of short or long links, the yield was not of sufficient extent to prevent the bending or breaking of the link under the circumstances referred to above.

To overcome these difficulties, I construct the coupling as shown in the accompanying drawing, in which A represents the coupling-head; B, the movable dog; D, the coupling-pin, and E the link. The dog B operates in a chamber, $a$, and with this chamber communicates the flaring front end $b$ of the coupling-head, and a chamber, $d$, formed in the coupling-head in the rear of the said chamber $a$. This chamber $a$ has an opening, $c$, at the bottom, through which the dog B is inserted, a pin, $e$, serving to retain the dog in place after insertion. In each side of the chamber $a$, adjacent to the inclined rear edge of the same, is formed an inclined slot, $f$, enlarged at its lower end, so as to form a recess, $i$, in which the upper end of a rib, $h$, on the dog B, rests, when the latter is in the position shown in Fig. 2. The coupling-pin D has a rib or fin, $m$, formed upon it, which bears upon the end of the dog B for the purpose of increasing the weight upon the same, in order to maintain the link in a horizontal position. The coupling-pin has a slot, $n$, terminating at the bottom in an opening, $o$, and to this opening is adapted the sliding bolt $p$, for retaining the pin in an elevated position when two adjoining cars are being uncoupled. The end of the sliding bolt $b$ works in the slot $n$ of the coupling-pin, and serves to guide the same and prevent its turning, (when a round pin is used,) thus maintaining the rib $m$ always in line with the opening in the coupling-head.

The operation of the coupling is as follows: The coupling-pin rests upon the end of the dog, and the upper end of the rib $h$ of the latter rests in the recess $i$, as shown in Fig. 2. The entering link will tilt the dog until its rear edge strikes the inclined rear edge of the chamber $a$, thus allowing the pin to fall and effect the coupling. (See Fig. 3.) If the pressure on the link is continued the effect will be to raise the dog and coupling-pin to an extent sufficient to allow the passage of the link, as shown in Fig. 4, the dog being guided and steadied in this movement by the rib $h$, which slides in the slots $f$. By thus allowing the dog to yield, when any undue pressure is brought to bear on the link the bending or breaking of the latter is effectually prevented. It should be understood, however, that the dog presents a sufficiently firm backing to the end of the link to enable the same to effect a coupling with an adjoining car before yielding to allow the inward passage of the link. In some instances I reduce the width of the rib $m$, as shown in Fig. 6, so as to allow the dog B to pass into the upper portion of the coupling, where it will bind itself and allow a free movement of the link, as indicated by dotted lines. When it is desired to bring the link to a horizontal position the coupling-pin is raised to an extent sufficient to permit the dog to fall and exert its weight on the inner end of the said link.

I claim as my invention—

1. A draw-head, having a recess, d, and having combined therewith a movable backing in front of the recess to resist the movement of the link until the application of excessive pressure, when it will yield and permit the link to pass into the said recess, all as set forth.

2. The combination, with the movable dog B and its ribs h, of the slots f and recesses i formed in the coupling-head, all substantially as and for the purpose set forth.

3. The rib m, formed directly on the coupling-pin D, and serving to impart the weight of the said pin to the movable dog, as and for the purpose described.

4. The combination, with the coupling-pin D, its slot n, and opening o, of the sliding bolt p, to operate as and for the purpose set forth.

In testimony whereof I have signed my name to this specification in the presence of two subscribing witnesses.

JOHN J. LAHAYE.

Witnesses:
HARRY SMITH,
HUBERT HOWSON.